(12) United States Patent
Ido

(10) Patent No.: US 8,606,072 B2
(45) Date of Patent: Dec. 10, 2013

(54) RECORDING PLAYBACK APPARATUS, RECORDING-PLAYBACK CONTROL METHOD, AND EDITING SYSTEM

(75) Inventor: Kazuo Ido, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 12/837,832

(22) Filed: Jul. 16, 2010

(65) Prior Publication Data

US 2011/0019975 A1  Jan. 27, 2011

(30) Foreign Application Priority Data

Jul. 23, 2009  (JP) ................................ P2009-172385

(51) Int. Cl.
*H04N 5/932*  (2006.01)

(52) U.S. Cl.
USPC .......................................... 386/219; 386/207

(58) Field of Classification Search
None
See application file for complete search history.

(56) References Cited

U.S. PATENT DOCUMENTS

| | | | | |
|---|---|---|---|---|
| 6,118,496 A | * | 9/2000 | Ho ................................. | 348/706 |
| 2002/0174440 A1 | * | 11/2002 | Usuba et al. ................... | 725/110 |
| 2004/0212690 A1 | * | 10/2004 | Nakase et al. ............. | 348/222.1 |
| 2005/0104957 A1 | * | 5/2005 | Okamoto et al. ................ | 348/97 |
| 2006/0239296 A1 | * | 10/2006 | Jinzaki et al. ................. | 370/468 |
| 2007/0273337 A1 | * | 11/2007 | Tolle et al. ..................... | 323/222 |
| 2009/0040377 A1 | * | 2/2009 | Kurahashi et al. ............ | 348/468 |
| 2010/0178036 A1 | * | 7/2010 | Heinmiller et al. ............. | 386/96 |

FOREIGN PATENT DOCUMENTS

| | | |
|---|---|---|
| JP | 60 69880 | 4/1985 |
| JP | 4-318387 | 11/1992 |
| JP | 8-102911 | 4/1996 |
| JP | 10-275417 | 10/1998 |
| JP | 11-297045 | 10/1999 |
| JP | 2001-136483 | 5/2001 |
| JP | 2001-275084 | 10/2001 |
| JP | 2007-74482 | 3/2007 |
| JP | 2008 53839 | 3/2008 |

* cited by examiner

*Primary Examiner* — Huy T Nguyen
*Assistant Examiner* — Eileen Adams
(74) *Attorney, Agent, or Firm* — Frommer Lawrence & Haug LLP; William S. Frommer

(57) ABSTRACT

A recording playback apparatus includes a video-signal converter performing certain signal processing to a video signal that is externally received and outputting the resulting video signal; a recorder player storing and playing back the video signal; and a controller switching between a normal mode and an edit mode on the basis of control by an editing apparatus controlling the recording playback apparatus. In the normal mode, a video signal played back by the recorder player is supplied to a display where the video signal is displayed as an image. In the edit mode, switching between a first video signal supplied from the video-signal converter and a second video signal resulting from addition of a delay corresponding to a time necessary for the signal processing in the video-signal converter to a video signal played back by the recorder player is performed to display the resulting video signal in the display.

7 Claims, 6 Drawing Sheets

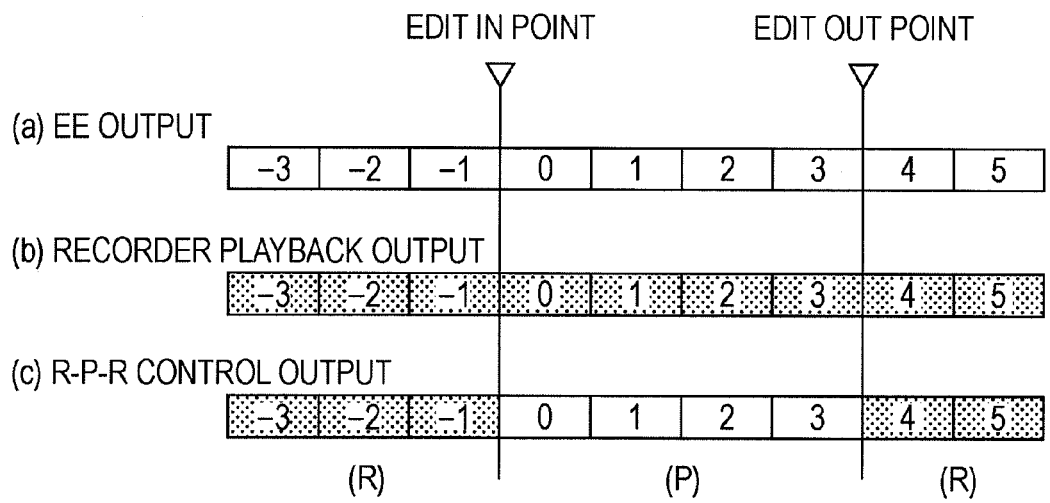
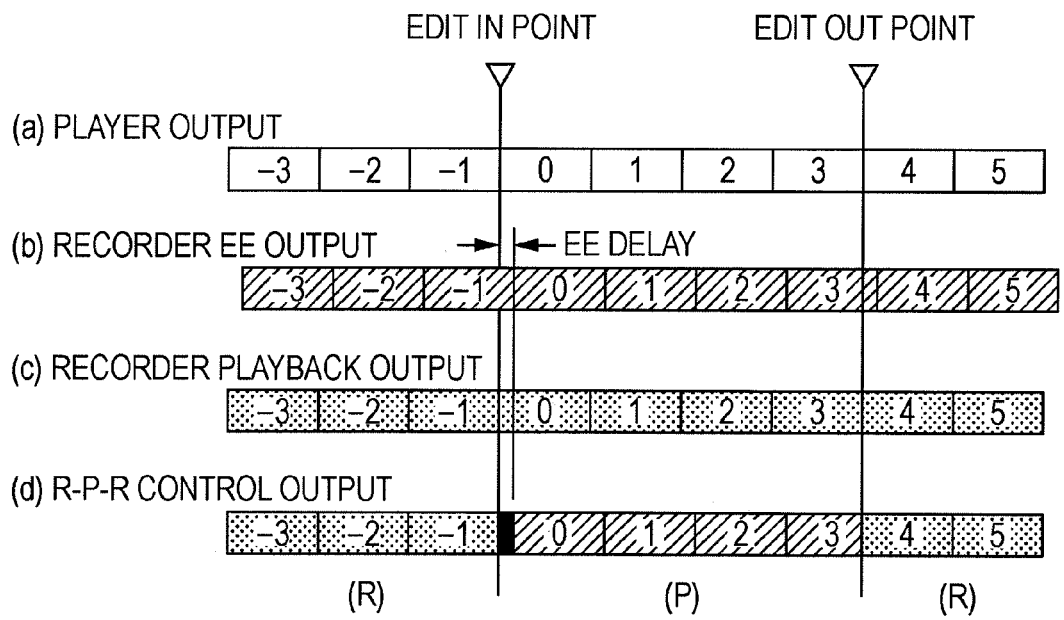

RECORDING PLAYBACK APPARATUS, RECORDING-PLAYBACK CONTROL METHOD, AND EDITING SYSTEM

BACKGROUND OF THE INVENTION

1. Field of the Invention

The present invention relates to a recording playback apparatus preferably applied to, for example, a recording apparatus having the function of an Electric-to-Electric (EE) mode in which video signals and audio signals that are externally received are output without being recorded and played back, a method of controlling the recording playback apparatus, and an editing system.

2. Description of the Related Art

Editing apparatuses having a function of controlling both players and recorders have been used in the production field of video content. Such editing apparatuses are capable of performing assemble editing and insert editing by controlling the players (at the playback side) and the recorders (at the recording side).

For example, in the insert editing, a base material (video) that is being played back by the recorder is replaced with a video that is being played back by the player at a time when a user performs an operation to specify an edit IN (start) point with the editing apparatus. The replacement is finished at a time when the user performs an operation to specify an edit OUT (end) point with the editing apparatus to switch to the base video.

In other words, the editing apparatus instructs the edit IN point and the edit OUT point for the player and the recorder. In addition, the editing apparatus controls the playback positions of the player and the recorder on the basis of time code so that the temporal position of an editing video that is being played back by the player coincides with the temporal position of a base video that is being played back by the recorder.

Furthermore, in the specification of the edit IN point and the edit OUT point, the editing apparatus switches between the output of a video recorded in the player and the output of a video recorded in the recorder to display each of the videos on the screen of one video monitor. Accordingly, the user can set the edit IN point and the edit OUT point while watching both the editing video and the base video on one screen.

FIG. 5 is a block diagram showing an example of the configuration of an editing system 50 in related art configured in the above manner. Referring to FIG. 5, the editing system 50 includes an editor apparatus 100, a player apparatus 200, a recorder apparatus 300, a video monitor apparatus 400, and a speaker apparatus 500.

The editor apparatus 100 is an editing apparatus having a function of controlling the recorder apparatus 300 and the player apparatus 200 on the basis of operations with an operation panel (not shown).

The player apparatus 200 plays back editing video and audio on the basis of control by the editor apparatus 100 to supply the resulting video and audio signals to the recorder apparatus 300. The recorder apparatus 300 supplies either the video and audio signals supplied from the player apparatus 200 or the video and audio signals played back by the recorder apparatus 300 to the video monitor apparatus 400 and the speaker apparatus 500, respectively, on the basis of control by the editor apparatus 100.

In the output of the video signal and the audio signal supplied from the player apparatus 200 by the recorder apparatus 300, the function of the EE mode is used. The function of the EE mode is a function of outputting a video signal and an audio signal externally input through a video input terminal and an audio input terminal (not shown) from a video output terminal and an audio output terminal (not shown) without recording and playing back the video signal and the audio signal. The output of video or audio played back by the player apparatus 200 from the recorder apparatus 300 by the function of the EE mode is hereinafter referred to as an "EE output." The control for output of the state of editing to the video monitor apparatus 400 and the speaker apparatus 500, described above, is hereinafter referred to as "Recorder-Player-Recorder (R-P-R) control."

FIG. 6 illustrates an example of how the R-P-R control in the related art is performed. Referring to FIG. 6, the horizontal axis represents time and numerical values, such as "−3" and "−2", indicate the frame numbers of video signals with respect to the edit IN point ("0"). FIG. 6(a) illustrates an EE output and FIG. 6(b) illustrates the output of a video signal played back by the recorder apparatus 300 (recorder playback output). FIG. 6(c) illustrates a video signal output from the recorder apparatus 300 as the result of the R-P-R control as an "R-P-R control output." Although the example of how to control the video signal is illustrated in FIG. 6, an audio signal is controlled in a similar manner.

In response to setting of the edit IN point by the editor apparatus 100, the video as the result of the EE output, illustrated in FIG. 6(a), is supplied to the video monitor apparatus 400 by the R-P-R control (FIG. 6(c)). In response to setting of the edit OUT point by the editor apparatus 100, the video signal that is being played back by the recorder apparatus 300, illustrated in FIG. 6(b), is supplied from the recorder apparatus 300 to the video monitor apparatus 400 (FIG. 6(c)).

However, practically, the frame position corresponding to the edit IN point does not exactly coincide with the frame position corresponding to the edit OUT point in both the EE output and the recorder playback output, unlike the example in FIG. 6. This is because a delay is caused by signal processing in the output of the video signal that is being played back by the player apparatus 200 from the recorder apparatus 300 with the function of the EE mode. Specifically, the timing of the EE output is slightly delayed because of the signal processing, such as analog-to-digital (A/D) conversion and conversion of the transmission mode, in the recorder apparatus 300.

FIG. 7 illustrates an example of how the R-P-R control is performed when an EE delay of a few lines occurs. The same reference numerals are used in FIG. 7 to identify the same components in FIG. 6. In the example in FIG. 7, a latter part of a frame "−1" is being output from the recorder apparatus 300 at a time when the edit IN point is specified, as illustrated in FIG. 7(b).

In other words, as illustrated in FIG. 7(d), a video signal corresponding to a latter part of the frame "−1" is being output at the time when the edit IN point is specified also in the R-P-R control output from the recorder apparatus 300. Accordingly, a video in which the video of the frame "−1" is mixed with the video of a frame "0" is displayed on the screen of the video monitor apparatus 400. However, when an EE delay of a few lines occurs, as in the example in FIG. 7, it is possible to set the edit IN point and the edit OUT point even if a shift occurs in the video displayed in the video monitor apparatus 400.

When only standard definition (SD) signals have been processed in the recorder apparatus 300, as in the related art, EE delays of only around a few lines have occurred. However, when video signals having a large amount of information, such as high definition (HD) signals, are also processed, EE delays of a large amount, for example, EE delays in units of frames occur. This is because a conversion process with the SD signals and an Interlace-Progressive conversion process are generally installed in the recorder apparatus 300 processing the HD signals and it takes a time corresponding to about one to two frames to perform such signal processing. In other words, a delay corresponding to the processing time occurs in the EE-mode signal.

As described above, when a large EE delay of, for example, one frame or more occurs, the frame displayed on the screen of the video monitor apparatus 400 is shifted from the frame in which the edit point is practically set as the result of the R-P-R control in the related art. In other words, it is not possible to appropriately set the edit IN point and the edit OUT point.

As one approach to resolve such a problem, a method of playing back a result that has been practically edited and recorded in the recorder apparatus 300 and supplying the result to the video monitor apparatus 4 and the speaker apparatus 5 is commonly used. Such a playback method is called "confirmation playback", which is disclosed in, for example, Japanese Unexamined Patent Application Publication No. 2001-266483.

FIG. 8 illustrates an example of how the R-P-R control is performed when an EE delay of one frame occurs. In the example in FIG. 8, the recorder apparatus 300 performs the confirmation playback to resolve the problem in that the video played back by the player apparatus 200 is shifted from the video played back by the recorder apparatus 300 in the playback position.

FIG. 8(*a*) illustrates a video signal that is being played back by the player apparatus 200 as a "player output." FIG. 8(*b*) illustrates an EE output from the recorder apparatus 300. FIG. 8(*c*) illustrates the output of a video signal played back by the recorder apparatus 300 (recorder playback output). FIG. 8(*d*) illustrates a video signal subjected to the confirmation playback by the recorder apparatus 300 as a "recorder confirmation output."

Since it is assumed in the example in FIG. 8 that an EE delay of one frame occurs, the player output in FIG. 8(*a*) is shifted from the EE output in FIG. 8(*b*) by the amount corresponding to one frame at a time when the edit IN point is set. In other words, the video signal of a frame "0" is being output from the player apparatus 200 while the video signal of a frame "−1" is being output in the EE output through the recorder apparatus 300.

Since the confirmation playback is performed in the recorder apparatus 300, the video signal that is being subjected to the confirmation playback, illustrated in FIG. 8(*d*), is delayed from the video signal that is being played back by the recorder apparatus 300, illustrated in FIG. 8(*c*), by the amount corresponding to two frames.

This delay is caused by the confirmation playback and a delay of a few frames or more normally occurs in this case. Since the signal is output after recording signal processing and playback signal processing are finished in the recorder apparatus 300 in the control method by the confirmation playback, there is a problem in that it takes a longer time to achieve the result of the R-P-R control.

However, it is possible to resolve the problem in that the frame displayed on the screen of the video monitor apparatus is shifted from the frame in which the edit point is practically set by the confirmation playback although a process delay caused by the confirmation playback occurs. In other words, it is possible to achieve a result substantially similar to the result of the R-P-R control.

SUMMARY OF THE INVENTION

When a linear medium, such as a tape, is used as the recording medium for the recorder apparatus 300, a delay of only a few frames is caused by the confirmation playback. In contrast, when a recording medium, such as a disk, which can be randomly accessed is used, it takes a few seconds or more to output the result of the confirmation playback in most cases.

The R-P-R control is necessary in so-called real-time editing in which the edit points are determined while confirming the videos that are being played back by the player apparatus 200 and the recorder apparatus 300 with the video monitor apparatus 400 and the speaker apparatus 500. Accordingly, the time consuming control in which it takes a few seconds to achieve the result of the R-P-R control is not appropriate for practical use.

It is desirable to realize the control in which the display of a base video and the display of an editing video are switched on a screen in a real-time manner.

According to an embodiment of the present invention, a recording playback apparatus includes a video-signal converter that performs certain signal processing to a video signal that is externally received and outputs the resulting video signal; a recorder player that stores and plays back the video signal; and a controller that switches between a normal mode and an edit mode on the basis of control by an editing apparatus that controls the recording playback apparatus. In the normal mode, a video signal played back by the recorder player is supplied to a display where the video signal is displayed as an image. In the edit mode, switching between a first video signal supplied from the video-signal converter and a second video signal resulting from addition of a delay corresponding to a time necessary for the signal processing in the video-signal converter to a video signal played back by the recorder player is performed to cause the display to output the resulting video signal.

With the above configuration, when the edit mode is selected, the switching between the second video signal resulting from addition of a delay corresponding to a time necessary for the signal processing in the video-signal converter to a video signal played back by the recorder player and the first video signal supplied from the video-signal converter is performed to cause the display to output the resulting video signal. Accordingly, the video of an externally input signal and the video of a playback signal can be displayed on the screen of the display in a state in which the playback phase of the externally input signal is matched with the playback phase of the playback signal without performing the confirmation playback causing a large process delay.

According to the present invention, it is possible to realize the control in which switching between the video of an externally input signal and the video of a playback signal is performed to display the video signal resulting from the switching on the screen of the display in a real-time manner.

BRIEF DESCRIPTION OF THE DRAWINGS

FIG. 4(*a*) illustrates a player output from a player apparatus, FIG. 4(*b*) illustrates an EE output from the recorder apparatus, FIG. 4(*c*) illustrates a playback output from the recorder apparatus in a normal mode, FIG. 4(d) illustrates a playback output from the recorder apparatus in an edit mode, and FIG. 4(e) illustrates an output from the recorder apparatus based on the R-P-R control;

FIG. 6 illustrates an example of how the R-P-R control in the related art is performed: FIG. 6(a) illustrates an EE output from a recorder apparatus, FIG. 6(b) illustrates a playback output from the recorder apparatus, and FIG. 6(c) illustrates an output from the recorder apparatus based on the R-P-R control;

FIG. 7 illustrates an example of how the R-P-R control in the related art is performed when a small amount of an EE delay occurs: FIG. 7(a) illustrates a player output from a player apparatus, FIG. 7(b) illustrates an EE output from the recorder apparatus, FIG. 7(c) illustrates a playback output from the recorder apparatus, and FIG. 7(d) illustrates an output from the recorder apparatus based on the R-P-R control; FIG. 8(a) illustrates a playback output from the player apparatus, FIG. 8(b) illustrates an EE output from the recorder apparatus, FIG. 8(c) illustrates a playback output from the recorder apparatus, and FIG. 8(d) illustrates a confirmation output from the recorder apparatus.

DESCRIPTION OF THE PREFERRED EMBODIMENTS

Embodiments of the present invention will herein be described with reference to the attached drawings.

[1. Example of Entire Configuration of Editing System]

Figure 1:
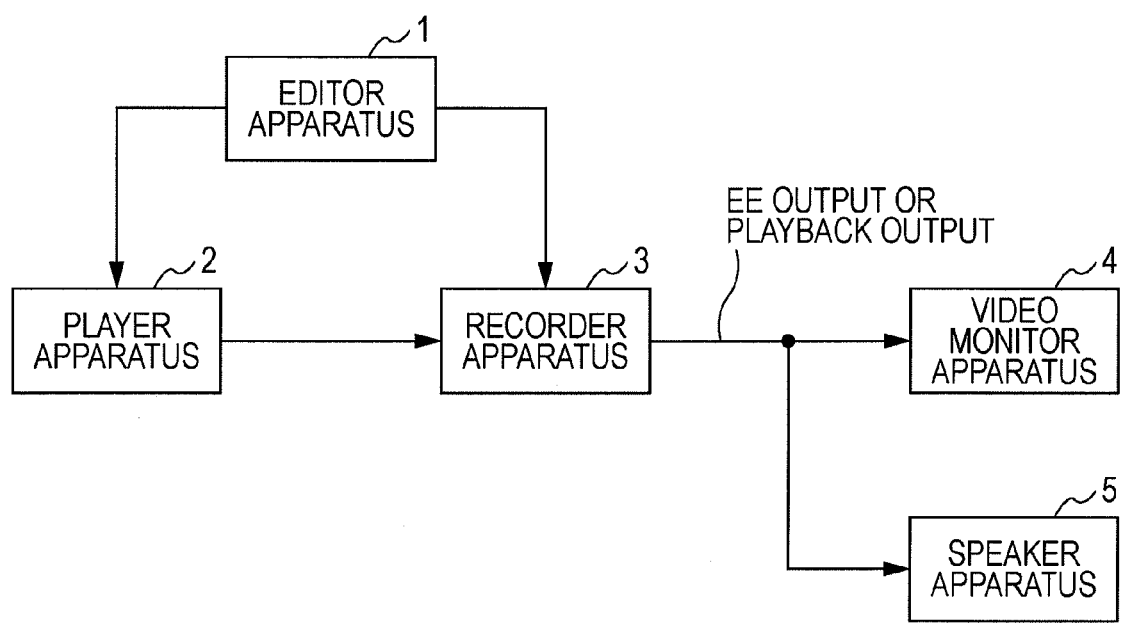
FIG. 1 is a block diagram showing an example of the configuration of an editing system according to an embodiment of the present invention.

FIG. 1 is a block diagram showing an example of the configuration of an editing system according to an embodiment of the present invention. Referring to FIG. 1, an editing system 10 includes an editor apparatus 1, a player apparatus 2, a recorder apparatus 3, a video monitor apparatus 4, and a speaker apparatus 5.

The editor apparatus 1 is an editing apparatus having a function of controlling the player apparatus 2 and the recorder apparatus 3. The editor apparatus 1 generates control signals to cause the player apparatus 2 and/or the recorder apparatus 3 to perform the following control or operations on the basis of user's operations with an operation panel (not shown) to supply the generated control signals to the player apparatus 2 and/or the recorder apparatus 3.

Adjustment (synchronization) between the playback phase in the player apparatus 2 and the playback phase in the recorder apparatus 3

Video tape recorder (VTR) operations for the player apparatus 2 and the recorder apparatus 3 (playback, fast forward, rewind, recording, stop, etc.)

Setting of the edit IN point and the edit OUT point for the recorder apparatus 3

Control of switching of the editing mode (normal mode and edit mode) for the recorder apparatus 3

The player apparatus 2 plays back editing video and audio on the basis of control by the editor apparatus 1 to supply the resulting video and audio signals to the recorder apparatus 3. The recorder apparatus 3 supplies either the video and audio signals supplied from the player apparatus 2 or the video and audio signals played back by the recorder apparatus 3 to the video monitor apparatus 4 and the speaker apparatus 5, respectively, on the basis of control by the editor apparatus 1.

The recorder apparatus 3 of the present embodiment functions as a player when the "normal mode" is specified by the editor apparatus 1. In this case, the recorder apparatus 3 plays back a video signal and an audio signal recorded in, for example, a recorder player described below to supply the resulting video signal and audio signal to the video monitor apparatus 4 and the speaker apparatus 5, respectively. In contrast, when the "edit mode" is specified by the editor apparatus 1, the recorder apparatus 3 performs the R-P-R control at the time when the edit IN point and the edit OUT point are received from the editor apparatus 1. Specifically, the recorder apparatus 3 switches between the video and audio signals supplied from the player apparatus 2 and the video and audio signals played back by the recorder apparatus 3 to supply the video signal and audio signal resulting from the switching to the video monitor apparatus 4 and the speaker apparatus 5, respectively. The output of the video and audio signals supplied from the player apparatus 2 is performed with the function of the EE mode described above.

In addition, when the "edit mode" is specified by the editor apparatus 1, the recorder apparatus 3 shifts the phases of the video and audio signals played back by the recorder apparatus 3 by an amount corresponding to an EE delay caused by the use of the function of the EE mode to supply the video signal and audio signal resulting from the shift to the video monitor apparatus 4 and the speaker apparatus 5, respectively. The configuration of the recorder apparatus 3 and the processing therein will be described in detail below.

The video monitor apparatus 4 is, for example, a liquid crystal display (LCD) and displays a video signal output from the recorder apparatus 3 as the result of the EE output or a video signal that is played back by the recorder apparatus 3 and output from the recorder apparatus 3 on the screen as an image. The speaker apparatus 5 outputs an audio signal output from the recorder apparatus 3 as the result of the EE output or an audio signal that is played back by the recorder apparatus 3 and output from the recorder apparatus 3 as an audio.

[2. Internal Configuration of Recorder Apparatus]

Figure 2:
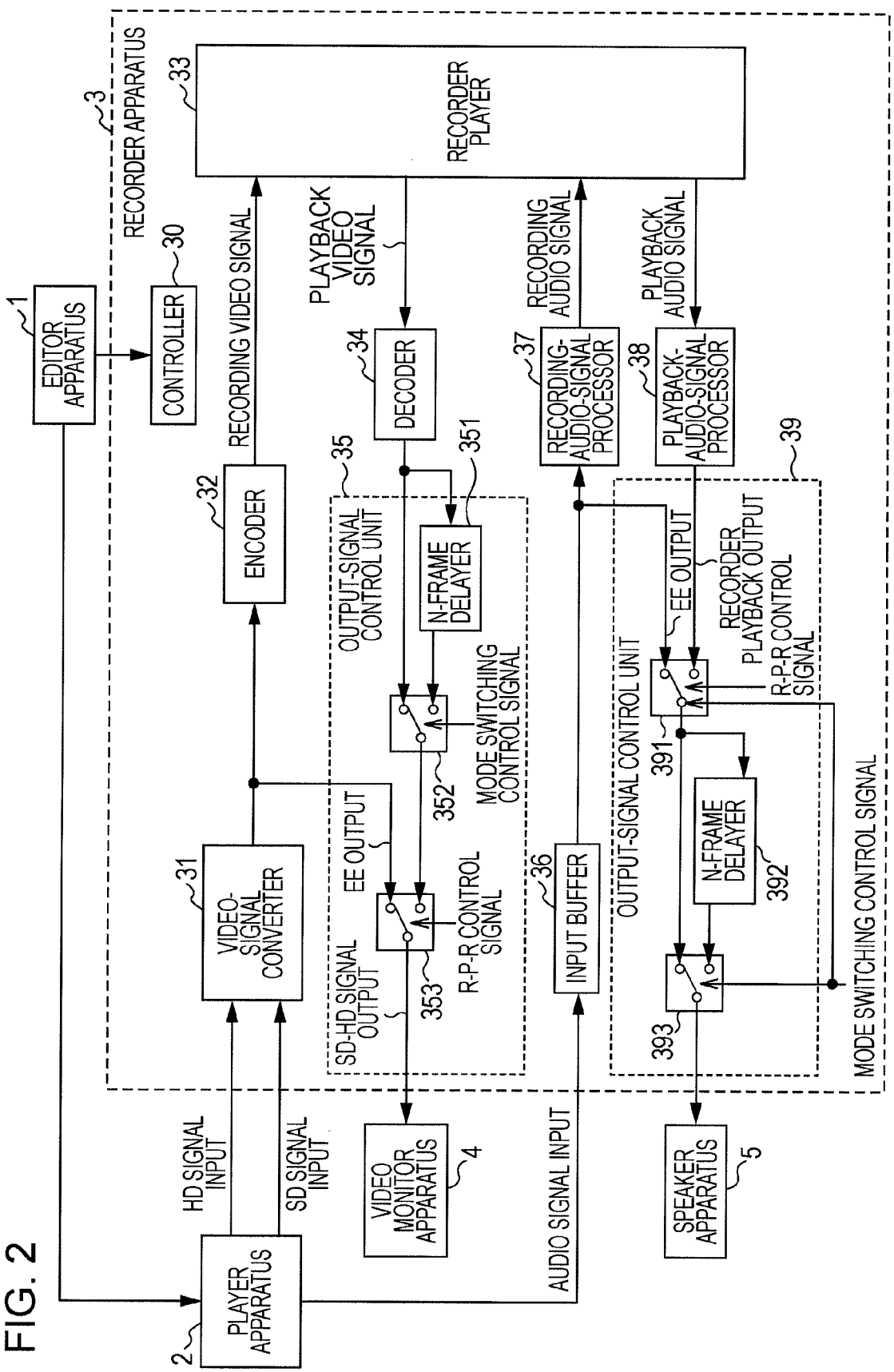
FIG. 2 is a block diagram showing an example of the internal configuration of a recorder apparatus according to an embodiment of the present invention.

FIG. 2 is a block diagram showing an example of the internal configuration of the recorder apparatus 3. Referring to FIG. 2, the recorder apparatus 3 includes a controller 30, a video-signal converter 31, an encoder 32, a recorder player 33, a decoder 34, and an output-signal control unit 35. The recorder apparatus 3 also includes an input buffer 36, a recording-audio-signal processor 37, a playback-audio-signal processor 38, and an output-signal control unit 39.

The controller 30 is, for example, a central processing unit (CPU) and controls each block in the recorder apparatus 3 on the basis of various control signals supplied from the editor apparatus 1. For example, when a signal to specify selection of the "normal mode" or the "edit mode" is supplied from the editor apparatus 1, the controller 30 generates a mode switching control signal for controlling the switching of the mode to supply the generated mode switching control signal to the output-signal control unit 35 and the output-signal control unit 39.

In addition, when the edit IN point and the edit OUT point are specified by the editor apparatus 1, the controller 30 generates an R-P-R control signal to supply the generated R-P-R control signal to the output-signal control unit 35 and the output-signal control unit 39. The R-P-R control signal instructs selection of a signal played back by the player apparatus 2 when the edit IN point is specified and selection of a signal played back by the recorder apparatus 3 when the edit OUT point is specified.

The video-signal converter 31 receives an HD signal or an SD signal from the player apparatus 2 and performs certain signal processing to the HS signal or the SD signal to supply the resulting signal to the output-signal control unit 35. The certain signal processing includes, for example, the A/D conversion, digital-to-analog (D/A) conversion, the conversion of the transmission mode, up-down conversion, and the IP conversion. The video signal subjected to the signal processing in the video-signal converter 31 is supplied to the output-signal control unit 35 as an EE output (a first video signal).

It is assumed in the recorder apparatus 3 of the present embodiment that it takes a time corresponding to about a few frames to perform the signal processing. In other words, a delay of a few frames is given to the video signal output from the video-signal converter 31.

The encoder 32 encodes the signal supplied from the video-signal converter 31 to supply the encoded signal to the recorder player 33. The recorder player 33 includes, for example, a memory and a disk. The recorder player 33 stores the video signal supplied from the encoder 32 and an audio signal supplied from the recording-audio-signal processor 37. In addition, the recorder player 33 plays back the video signal or the audio signal the playback of which is instructed by the controller 30 to supply the resulting signal to the decoder 34 or the playback-audio-signal processor 38.

The decoder 34 decodes the playback signal read out by the recorder player 33 to supply the decoded signal to the output-signal control unit 35.

The output-signal control unit 35 includes an N-frame delayer 351, a mode switcher 352, and an output-signal switcher 353. The N-frame delayer 351 gives a delay corresponding to frames of N-number (N is a natural number) that is set in advance to a playback video signal supplied from the decoder 34 to supply the resulting signal to the mode switcher 352. Specifically, the N-frame delayer 351 shifts the playback phase of the playback video signal from the reference time code by the N-number frames. At this time, the phase of the time code to be supplied to the editor apparatus 1 for the control of the synchronization in the editor apparatus 1 is kept to a reference phase.

The N-number frames representing the amount of shift of the playback phase are set in accordance with the processing time (the time of EE delay) in the video-signal converter 31. If the amount of EE delay corresponds to, for example, two frames, the amount of delay set in the N-frame delayer 351 corresponds to two frames.

The mode switcher 352 is a switch. The mode switcher 352 selects either the video signal supplied from the decoder 34 or the video signal (second video signal) supplied from the N-frame delayer 351 to supply the selected video signal to the output-signal switcher 353. The selection is performed in accordance with the mode switching control signal supplied from the controller 30. Specifically, the mode switcher 352 switches to the side of the decoder 34 when the switching to the "normal mode" is instructed by the mode switching control signal and switches to the side of the N-frame delayer 351 when the switching to the "edit mode" is instructed by the mode switching control signal.

Accordingly, when the "normal mode" is selected, the video signal that is played back by the recorder player 33 and is decoded in the decoder 34 is selected. In contrast, when the "edit mode" is selected, the video signal to which a delay of N-number frames corresponding to the amount of EE delay is given in the N-frame delayer 351 after being played back by the recorder player 33 and being decoded in the decoder 34 is selected.

The output-signal switcher 353 is a switch. The output-signal switcher 353 selects either the video signal supplied from the video-signal converter 31 as the result of the EE output or the video signal supplied from the mode switcher 352 to supply the selected video signal to the video monitor apparatus 4. The selection is performed in accordance with the R-P-R control signal supplied from the controller 30.

Specifically, when the R-P-R control signal generated at the specification of the edit IN point is received, the output-signal switcher 353 switches to the side of the video-signal converter 31 to supply the video signal resulting from the EE output to the video monitor apparatus 4. When the R-P-R control signal generated at the specification of the edit OUT point is received, the output-signal switcher 353 switches to the side of the mode switcher 352 to supply the video signal to which a delay of N-number frames is given by the N-frame delayer 351 to the video monitor apparatus 4.

When the mode switching control signal to instruct switching to the "normal mode" is received from the controller 30, the output-signal switcher 353 is fixed to the side of the mode switcher 352. In this case, the video signal that is supplied from the decoder 34 and that is selected by the mode switcher 352 (the video signal to which a delay corresponding to the amount of EE delay is not given) is supplied to the video monitor apparatus 4.

The input buffer 36 temporarily stores an audio signal played back by the player apparatus 2 to supply the audio signal to the recording-audio-signal processor 37. In other words, a delay corresponding to the amount of EE delay in the video signal does not occur in the audio signal.

The recording-audio-signal processor 37 performs, for example, adjustment of the level (audio volume), channel mixing, muting, adjustment of the timing to the audio signal supplied from the input buffer 36. The recording-audio-signal processor 37 supplies the audio signal subjected to such adjustment, which is a recording audio signal, to the recorder player 33.

The playback-audio-signal processor 38 performs, for example, adjustment of the level, channel mixing, muting, adjustment of the timing to a playback audio signal played back by the recorder player 33. The playback-audio-signal processor 38 supplies the audio signal subjected to such adjustment to the output-signal control unit 39.

The output-signal control unit 39 includes an output-signal switcher 391, an N-frame delayer 392, and a mode switcher 393. The output-signal switcher 391 is a switch. The output-signal switcher 391 selects either the audio signal output from the input buffer 36 as the result of the EE output or the audio signal supplied from the playback-audio-signal processor 38 on the basis of the R-P-R control signal supplied from the controller 30.

The output-signal switcher 391 supplies the selected audio signal to the N-frame delayer 392 and the mode switcher 393.

The N-frame delayer 392 gives a delay of N-number frames to the audio signal supplied from the output-signal switcher 391 to output the audio signal to which the delay is given. It is assumed here that the same amount of delay as the one set in the N-frame delayer 351 is set in advance in the N-frame delayer 392. In other words, the processing in the N-frame delayer 392 is performed to match the output timing with the one at the side of the video signal.

The mode switcher 393 is a switch. The mode switcher 393 selects either the audio signal supplied from the output-signal switcher 391 or the audio signal supplied from the N-frame delayer 392 to supply the selected audio signal to the speaker apparatus 5. The selection is performed in accordance with the mode switching control signal supplied from the controller 30. Specifically, the mode switcher 393 is switched to the side of the output-signal switcher 391 when the switching to the "normal mode" is instructed with the mode switching control signal and is switched to the side of the N-frame delayer 392 when the switching to the "edit mode" is instructed with the mode switching control signal.

Accordingly, when the "normal mode" is selected, the audio signal that is played back by the recorder player 33 and that is subjected to certain signal processing in the playback-audio-signal processor 38 is selected and the selected audio signal is supplied to the speaker apparatus 5. In contrast, when the "edit mode" is selected, the audio signal to which a delay of N-number frames corresponding to the amount of EE delay is given in the N-frame delayer 392 after being played back by the recorder player 33 and being subjected to certain signal processing in the playback-audio-signal processor 38 is selected and the selected audio signal is supplied to the speaker apparatus 5.

[3. Example of Operation of Recorder Apparatus]

Figure 3:
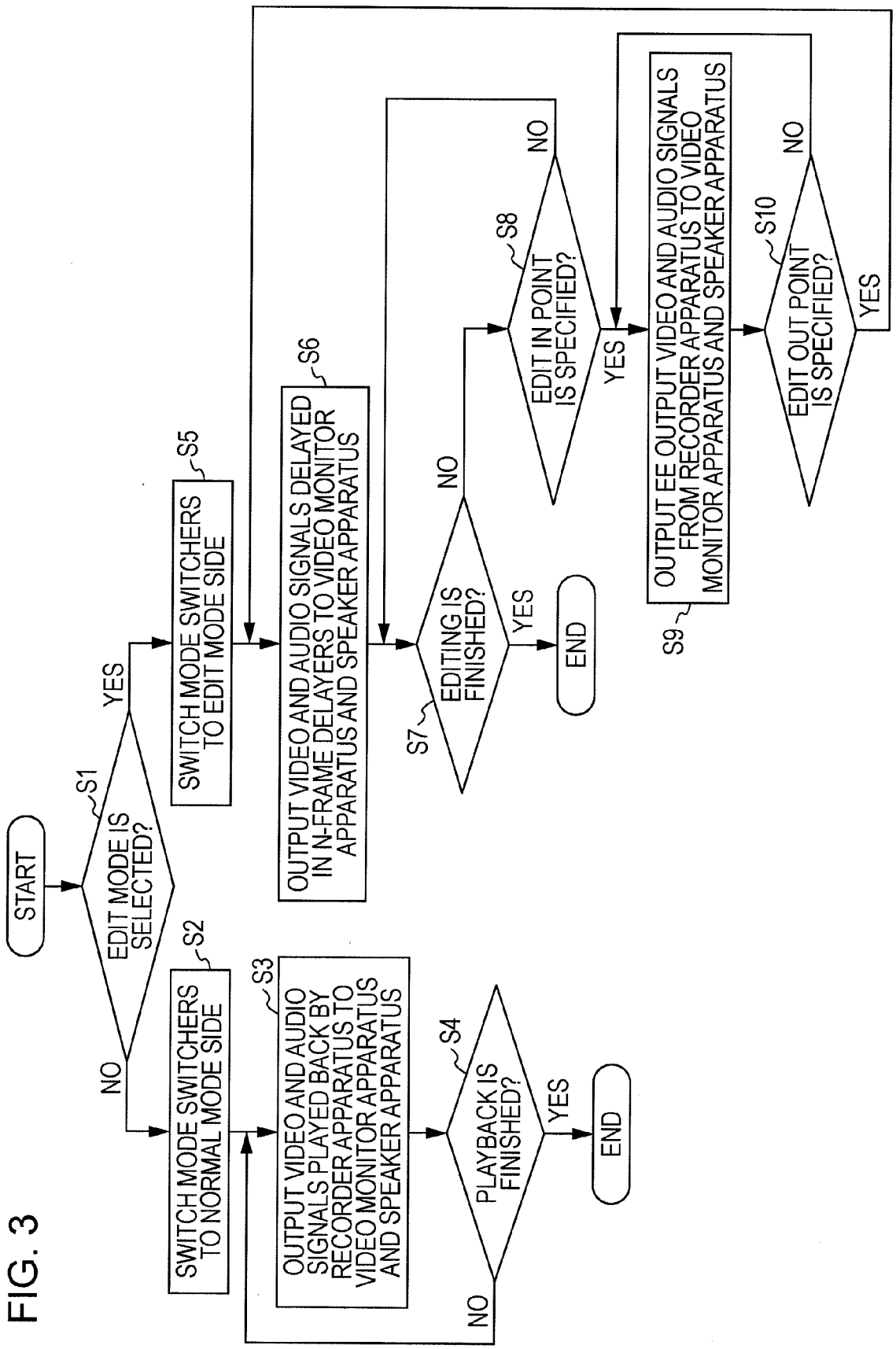
FIG. 3 is a flowchart showing an example of R-P-R control according to an embodiment of the present invention.

FIG. 3 is a flowchart showing an example of the operational process in the recorder apparatus 3. Referring to FIG. 3, in Step S1, it is determined whether the "edit mode" is selected. Specifically, it is determined in the controller 30 in the recorder apparatus 3 whether the control signal to select the "edit mode" is supplied from the editor apparatus 1.

If the selection of not the "edit mode" but the "normal mode" is instructed, then in Step S2, the mode switcher 352 and the mode switcher 393 are switched to the side of the "normal mode". Specifically, the mode switcher 352 at the video signal side is switched to the side of the decoder 34 and the mode switcher 393 at the audio signal side is switched to the side of the output-signal switcher 391.

In Step S3, the video signal and the audio signal played back by the recorder apparatus 3 are supplied to the video monitor apparatus 4 and the speaker apparatus 5, respectively. Specifically, the base video signal and the base audio signal played back by the recorder player 33 are supplied to the video monitor apparatus 4 and the speaker apparatus 5, respectively. In Step S4, it is determined whether the playback is finished. If the playback is finished, the process in the recorder apparatus 3 is completed. If the playback is not finished, the process goes back to Step S3 to repeat the steps.

If it is determined in Step S1 that the "edit mode" is selected, then in Step S5, the mode switcher 352 and the mode switcher 393 are switched to the side of the "edit mode" under the control of the controller 30. Specifically, the mode switcher 352 at the video signal side is switched to the side of the N-frame delayer 351 and the mode switcher 393 at the audio signal side is switched to the side of the N-frame delayer 392. In Step S6, the video signal and the audio signal to which delays are given in the N-frame delayer 351 and the N-frame delayer 392 are supplied to the video monitor apparatus 4 and the speaker apparatus 5, respectively.

In Step S7, it is determined whether a control signal to notify the completion of the editing is received from the controller 30. If the completion of the editing is notified, the process in the recorder apparatus 3 is completed. If the completion of the editing is not notified, then in Step S8, it is determined whether the edit IN point is specified by the editor apparatus 1.

If the instruction to specify the edit IN point is not received, the process goes back to Step S7 to repeat the determination. If the instruction to specify the edit IN point is received, then in Step S9, the video signal and the audio signal output from the recorder apparatus 3 as the result of the EE output are supplied to the video monitor apparatus 4 and the speaker apparatus 5, respectively. Specifically, the output-signal switcher 353 at the video signal side is switched to the side of the video-signal converter 31 (at the side of the EE output) and the output-signal switcher 391 at the audio signal side is switched to the side of the input buffer 36 (at the side of the EE output).

In Step S10, it is determined whether the edit OUT point is specified by the editor apparatus 1. If the edit OUT point is not specified, the process goes back to Step S9 to repeat the steps. If the edit OUT point is specified, the process goes back to Step S6 to repeat the steps.

With the above process, when the "normal mode" is selected, the recorder apparatus 3 functions as a player that plays back the video signal and the audio signal stored in the recorder player 33. When the "edit mode" is selected and the edit IN point is specified, the video signal and the audio signal as the result of the EE output are supplied to the video monitor apparatus 4 and the speaker apparatus 5, respectively. When the edit OUT point is specified, the video signal and the audio signal which are read out from the recorder player 33 and whose playback phases are shifted by the amount of N-number frames corresponding to the amount of EE delay are supplied to the video monitor apparatus 4 and the speaker apparatus 5, respectively.

[4. Specific Example of R-P-R Control by Recorder Apparatus]

Figure 4:
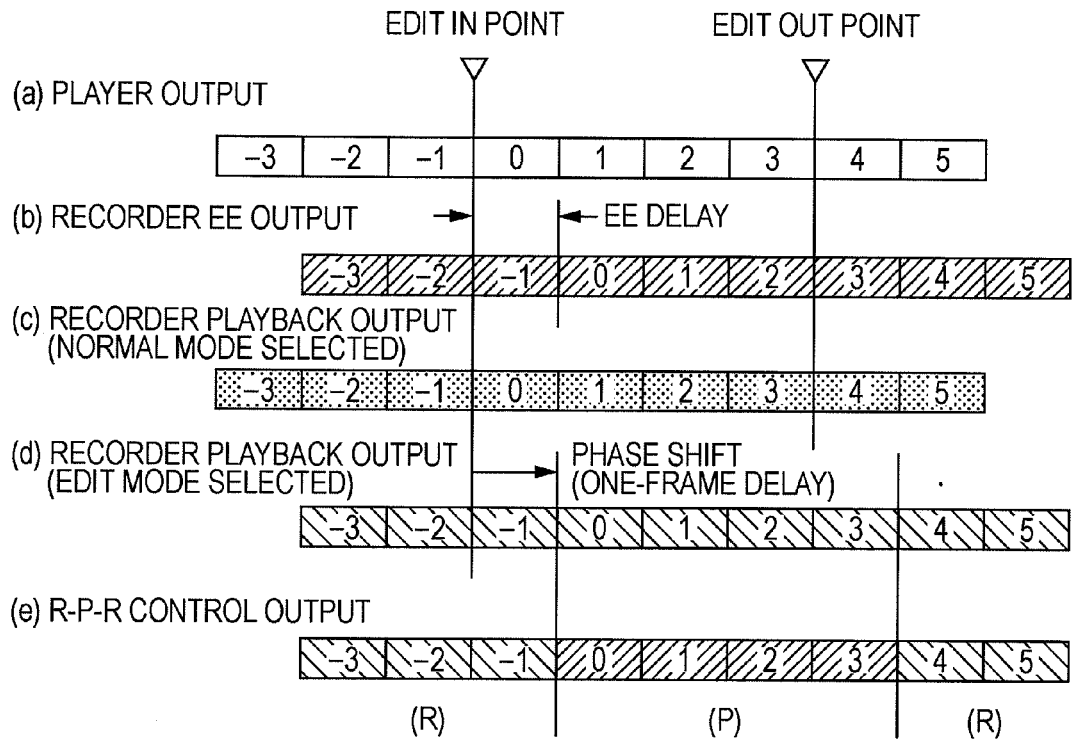
FIG. 4 illustrates an example of how the R-P-R control according to an embodiment of the present invention is performed.
Figure 5:
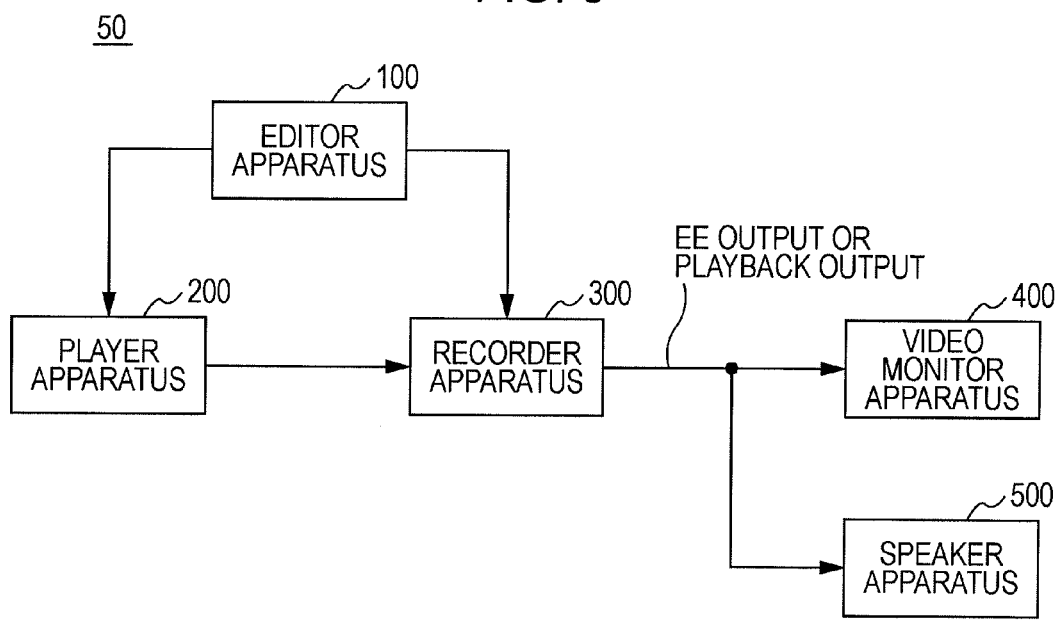
FIG. 5 is a block diagram showing an example of the configuration of an editing system in related art.
Figure 8:
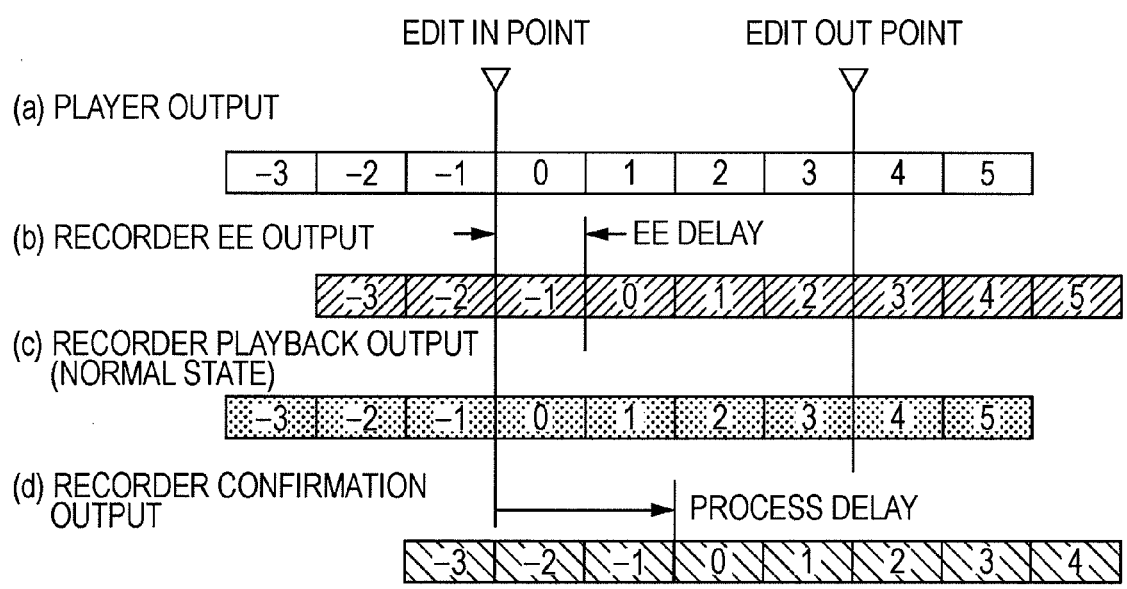
FIG. 8 illustrates an example of how the R-P-R control in the related art is performed when a large amount of an EE delay occurs.

FIG. 4 illustrates an example of how the R-P-R control is performed in the recorder apparatus 3 when an EE delay of one frame occurs. FIG. 4(a) illustrates a video signal played back by the player apparatus 2 as a "player output." FIG. 4(b) illustrates an EE output from the recorder apparatus 3. FIG. 4(c) illustrates a playback video signal from the recorder apparatus 3 when the "normal mode" is selected as a "recorder playback output." FIG. 4(d) illustrates a playback video signal from the recorder apparatus 3 when the "edit mode" is selected as a "recorder playback output." FIG. 4(e) illustrates a video signal output from the recorder apparatus 3 as the result of the R-PR control as an "R-P-R control output."

The video signal corresponding to a frame "0" is being output at the time when the edit IN point is set in the player output in FIG. 4(a). A delay of one frame occurs due to the EE delay and the video signal corresponding to a frame "−1" is being output in the EE output in FIG. 4(b). In contrast, the video signal corresponding to the frame "0" with no delay is being output in the recorder playback output in FIG. 4(c). In the recorder apparatus 3 of the present embodiment, the operation in FIG. 4(c) is performed in the "normal mode" in which only the playback is performed without editing.

FIG. 4(d) illustrates a playback output by the recorder apparatus 3 when the "edit mode" is selected. When the "edit mode" is selected, the video signal whose playback phase is shifted by the amount of N-number frames corresponding to the amount of EE delay as the result of the processing described above is output from the recorder apparatus 3. In the example in FIG. 4(d), the video signal to which a delay of one frame is given is output from the recorder apparatus 3.

As the result of the R-P-R control in which the output is switched at the time corresponding to the edit IN point and at the time corresponding to the edit OUT point, the video signal illustrated in FIG. 4(e) is output from the recorder apparatus 3. Specifically, the playback video signal whose playback phase is shifted in accordance with the amount of EE delay is output before the edit IN point is specified, and the output from the recorder apparatus 3 is switched to the EE output to which the EE delay is given at the time when the edit IN point is specified.

As a result, the playback phase of the EE output based on the input signal from the player apparatus 2 is matched with that of the playback output by the recorder apparatus 3.

[Advantages of Embodiments]

According to the above embodiments, the video and audio signals are supplied even from the recorder apparatus 3 having a large amount of EE delay to the video monitor apparatus 4 and the speaker apparatus 5, respectively, in a state in which the playback phase of the EE output is matched with the playback phase of the playback output by the recorder apparatus 3 without performing the confirmation playback. Accordingly, the amounts of delay of the video and audio signals supplied to the video monitor apparatus 4 and the speaker apparatus 5, respectively, can be reduced, compared with the case in which the confirmation playback is performed. Consequently, it is possible to realize the R-P-R control in a real-time manner necessary in the real-time editing.

In addition, according to the above embodiments, it is possible to resolve the problem of the shift in phase between the EE output and the playback output by the recorder apparatus 3 by a simple method in which a delay of N-number frames corresponding to the amount of EE delay is given to the video and audio signals played back by the recorder apparatus 3.

Furthermore, according to the above embodiments, the amount of delay corresponding to the EE delay is given not only to the video signal where the EE delay occurs but also to the audio signal and the video and audio signals to which the delay is given are output, so that the R-P-R control is performed in a state in which the video signal is synchronized with the audio signal.

Furthermore, according to the above embodiments, since only the playback phase of the playback output by the recorder apparatus 3 is shifted without varying the phase of the reference time code even in the "edit mode," it is not necessary to change the content of control in the editor apparatus 1. In other words, it is possible to easily realize the R-P-R control in a real-time manner only by varying the configuration and/or processing in the recorder apparatus 3.

Furthermore, according to the above embodiments, the playback phases of the video and audio signals played back by the recorder apparatus 3 are shifted only when the "edit mode" is selected. Accordingly, when the "edit mode" is not selected, that is, when the "normal mode" is selected, the video and audio signals having the normal phase in which no shift occurs in the playback phase are output from the recorder apparatus 3. Consequently, it is possible to use the recorder apparatus 3 as a player by a simple operation to switch to the "normal mode" without changing, for example, the settings in the recorder apparatus 3.

[Exemplary Modifications]

A delay of N-number frames are given to the EE output signal or the recorder playback output signal selected by the output-signal switcher 391 (refer to FIG. 2) and, then, the output signal is switched depending on the mode in the processing at the side of the audio signal in the above embodiments. However, the order of processing is not limited to the above one. For example, as at the side of the video signal, the switching between the recorder playback output to which a delay of N-number frames is given and the recorder playback output to which no delay is given may be performed depending on the selected mode and, then, the R-P-R control by the output-signal switcher 391 may be performed. Alternatively, the processing in the video-signal converter 31 may be performed in the processing of the playback signal, for example, to the output from the mode switcher 352. Alternatively, the EE output of the audio signal may be acquired from the output from the recording-audio-signal processor 37.

The present application contains subject matter related to that disclosed in Japanese Priority Patent Application JP 2009-172385 filed in the Japan Patent Office on Jul. 23, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording playback apparatus comprising:
   a video-signal processor that receives and processes an externally supplied video signal and outputs a processed video signal, the video-signal processor performing conversion processing on said supplied video signal, including at least one of analog-to-digital conversion, digital-to analog conversion, transmission mode conversion, interlace-progressive conversion or up-down conversion, said video signal processor exhibiting an inherent processing time delay determined by the conversion processing of said supplied video signal;
   a recorder player that stores and plays back the processed video signal;
   a delayer that receives and delays, by a time delay substantially equal to said inherent processing time delay of said video-signal processor, the video signal played bark by the recorder player, and
   a controller that switches between (i) a normal mode in which the video signal played back by the recorder player is supplied to a display where the video signal is displayed and (ii) an edit mode in which an edited video signal is supplied to the display, said edited video signal being produced by edit switching means supplied with the delayed video signal played back by the recorder player and the processed video signal, such that in said edit mode, the edit switching means switches from the delayed video signal supplied thereto to the processed video signal at an edit-in point and said edit switching means switches from said processed video signal to said delayed video signal at an edit-out point.

2. The recording playback apparatus according to claim 1, wherein the switching of the edit switching means is performed only when the edit mode is specified.

3. The recording playback apparatus according to claim 2, wherein the processing by said video-signal processor is up conversion of the video signal and down conversion of the video signal.

4. The recording playback apparatus according to claim 3, wherein said delayer comprises:
   a frame delayer that provides a delay of N-number frames to the video signal played back by the recorder player.

5. The recording playback apparatus according to claim 4, further comprising:
   an input buffer that temporarily stores an audio signal that is externally received,
   wherein the recorder player stores and plays back the audio signal supplied from the input buffer, and
   an audio delay that receives and delays, by the time delay substantially equal to said processing time delay, the audio signal played back by the recorder player,
   wherein the controller supplies an audio signal played back by the recorder player to a speaker when the normal mode is selected, and when the edit mode is selected, the controller supplies an edited audio signal to the speaker, the edited audio signal being produced by switching between the audio signal from the input buffer and the delayed audio signal.

6. A recording playback control method comprising:

receiving and processing by a signal processor an externally supplied video signal and outputting a processed video signal, the video-signal processing performing conversion processing on said supplied video signal, including at least one of analog-to-digital conversion, digital-to-analog conversion, transmission mode conversion, interlace-progressive conversion or up-down conversion, said video-signal processing exhibiting an inherent processing time delay determined by the conversion processing of said supplied video signal;

storing and playing back the processed video signal;

delaying, by a time delay substantially equal to said inherent processing time delay of said signal processor, the played back video signal, and switching between (i) a normal mode in which the played back video signal is supplied without delay to a display where the video signal is displayed and (ii) an edit mode in which an edited video signal is supplied to the display, said edited video signal being produced by edit switching between the delayed played back video signal and the processed video signal, such that in said edit mode, the edit switching switches from the delayed video signal to the processed video signal at an edit-in point and switches from said processed video signal to said delayed video signal at an edit-out point.

7. An editing system comprising:

a player apparatus that plays back a video signal and outputs the resulting video signal;

a recording playback apparatus including a video-signal processor that receives and processes the video signal from the player apparatus and outputs a processed video signal, the video-signal processor performing conversion process on said supplied video signal, including at least one of analog-to-digital conversion, digital-to-analog conversion, transmission mode conversion, interlace-progressive conversion or up-down conversion, said video signal processor exhibiting an inherent processing time delay determined by the conversion processing of said supplied video signal;

a recorder player that stores and plays back the processed video signal;

a delayer that receives and delays, by a time delay substantially equal to said inherent processing time delay of said video-signal processor, the video signal played back by the recorder player, and a controller that switches between (i) a normal mode in which the video signal played back by the recorder player is supplied to a display where the video signal is displayed and (ii) an edit mode in which an edited video signal is supplied to the display, said edited video signal being produced by edit switching means supplied with the delayed video signal played back by the recorder player and the processed video signal, such that in said edit mode, the edit switching means switches from the delayed video signal supplied thereto to the processed video signal at an edit-in point and said edit switching means switches from said processed video signal to said delayed video signal at an edit-out point; and editor apparatus that selects the normal mode or the edit mode.

* * * * *